Jan. 12, 1965 S. V. MARZEC 3,165,622
HEAT SEALING MEANS
Filed June 6, 1962 3 Sheets-Sheet 1

INVENTOR.
STANISLAUS V. MARZEC
BY James P. Malone
ATTORNEY

Jan. 12, 1965  S. V. MARZEC  3,165,622
HEAT SEALING MEANS

Filed June 6, 1962  3 Sheets-Sheet 2

INVENTOR.
STANISLAUS V. MARZEC
BY
ATTORNEY

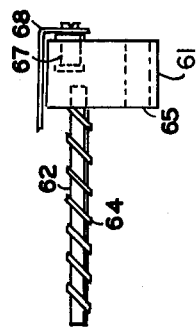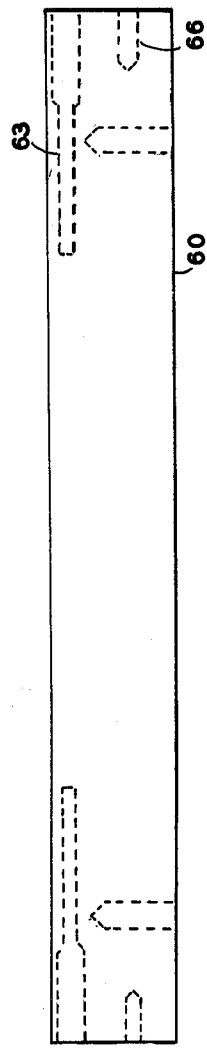

3,165,622
HEAT SEALING MEANS
Stanislaus V. Marzec, Massapequa Park, N.Y., assignor to Gerace Electronics Corp., Brooklyn, N.Y.
Filed June 6, 1962, Ser. No. 200,407
2 Claims. (Cl. 219—243)

This invention relates to heat sealing means and more particularly to means for heat sealing plastic sheets or bags with pulsed electrical energy.

The invention generally comprises a stationary lower heater bar, and a piston operated upper pressure bar. The lower bar includes a strip of Nichrome heating elements connected to a source of pulsed electrical energy. The heater strip is covered with a non-sticking plastic cover for instance of Teflon which also serves as electrical insulation. The upper pressure bar is mounted above the stationary heater bar and is operated by an air pressure cylinder. Control means are provided to electrically control and synchronize the movement of the pressure bar with the electrical pulse to the heater.

The sheets to be sealed together are placed between the open jaws, then a foot switch is actuated which sets off the entire sequence of operations, namely, the movement of the pressure bar and the pulsing of the electrical heater energy. This movement is synchronized so that as the pressure is applied the heat is also applied. The pressure bar is then raised so that the sealed piece can be removed and a new piece inserted.

Accordingly a principal object of the invention is to provide new and improved heat sealing means.

Another object of the invention is to provide new and improved heat sealing means having a stationary heater bar and a movable pressure bar.

Another object of the invention is to provide new and improved heat sealing means having a stationary heater bar, a movable pressure bar, and improved heat sealing means having a stationary heater bar and a movable pressure bar.

Another object of the invention is to provide new and improved heat sealing means having a stationary heater bar, a movable pressure bar, and improved heat sealing means having a stationary heater bar and a movable pressure bar, wherein the heat energy is pulsed in synchronism with the movement of the pressure bar.

Another object of the invention is to provide new and improved heat sealing means comprising a stationary heater bar, a movable pressure bar adapted to squeeze the article to be sealed between itself and the heater bar, and means to apply pulses of heating energy to the heater in synchronism with the movement of the pressure bar.

These and other objects of the invention will be apparent from the following specification and drawings, of which FIG. 1 is a perspective view of an embodiment of the invention.

FIG. 4 is a side view of a heating bar.

FIG. 5 is a side view of a mounting bar adapted to fit the heater bar of FIG. 4.

Figure 1:
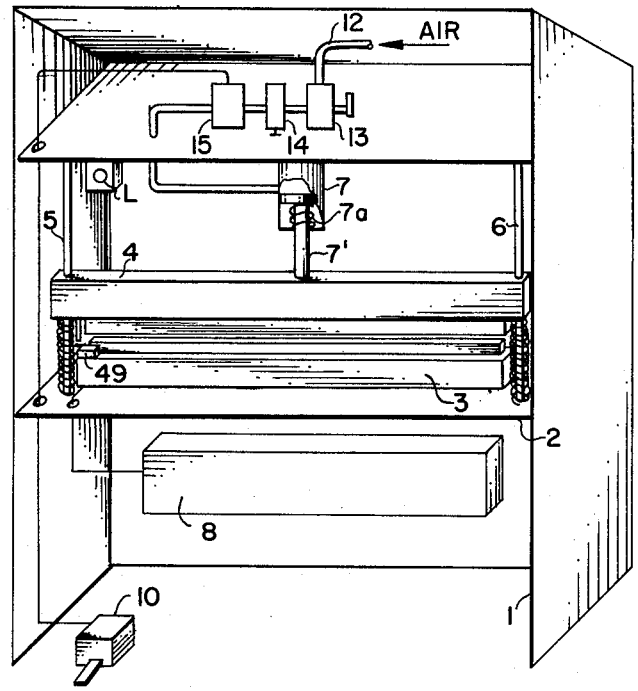

Referring to the figures, FIG. 1 shows a work station or booth 1 having a flat table 2 mounted at a convenient working height. The lower heating bar 3 is fixedly mounted on the table 2. The upper pressure bar 4 is slidably mounted on the guides 5 and 6 and is adapted to be moved up and down by means of the air pressure piston cylinder 7 and shaft 7'. The control circuits are contained in the box 8. A foot switch 10 is provided to actuate the apparatus. High pressure air is provided to pipe 12 which is connected to an air regulator 13 which in turn is connected to a reducing valve 14. The output of the valve 14 is connected to a solenoid operated valve 15. The output of the valve 15 is connected to the spring loaded air cylinder 7 where it is used to move the pressure bar 4 down.

The operator stands in front of the booth and places the material to be sealed on top of the heater bar 3. The operator then presses the foot switch 10 which causes the pressure bar to move down to press the material between the pressure bar and the heater bar and at the proper time a synchronized pulse of heating energy is applied to the heater bar as will be explained.

Figure 2:
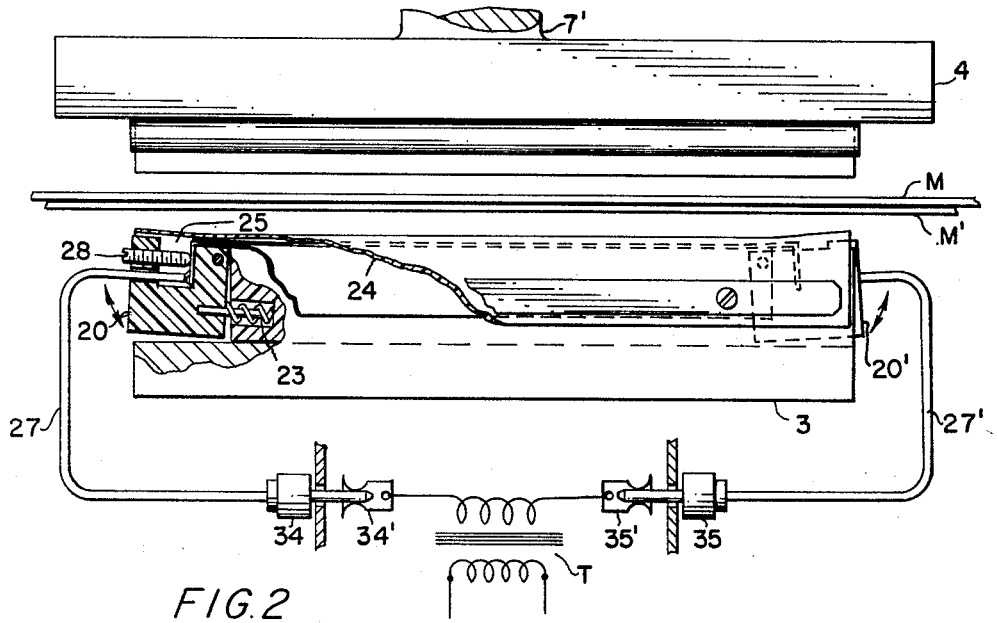
FIG. 2 is an enlarged detail side view of the heating and pressure bars.

FIG. 2 shows an enlarged detailed view of the heater bar 3 and the pressure bar 4. Two layers of material M and M' are shown placed between the pressure bar and the heater bar. As previously explained the pressure bar is moved up and down by means of the shaft 7'.

Referring to FIGURE 2, the heater bar 3 has loosely connected blocks 20 and 20' at either end for the purpose of mounting the heater strip 25. The blocks 20 and 20' are spring loaded by the spring 23 and a corresponding spring on the other side. The heater strip 25 is secured to the block 20 by means of adjustment screw 28. Over the heater strip 25, is placed a sheet 24 of electrical insulation of non-sticking plastic for instance, Teflon. The sheet 24 is connected loosely over heater strip 25 so as not to interfere with the flexing of strip 25.

Referring again to FIG. 2 the power leads 27 and 27' terminate in a pair of plugs 34, 35 which fit into jacks 34' and 35' which are connected to the secondary of transformer T.

Figure 3:
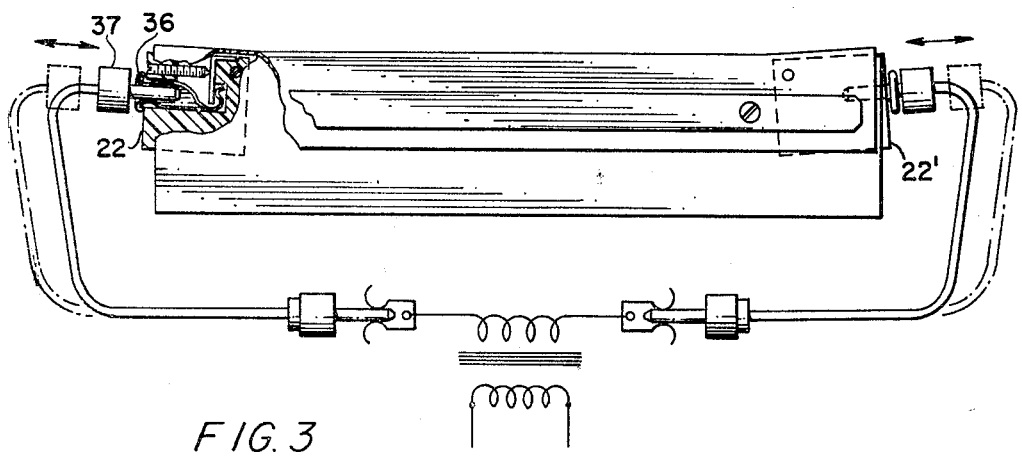
FIG. 3 is a detail view of a modification of the heating bar.

FIG. 3 shows modified connection blocks 22, 22' which each have a jack 36 built into them to receive the plug 37. The blocks 22, 22' are spring loaded as in FIG. 2. This modification provides an alternate connection means. The purpose of the spring loading of the blocks 22, 22' is to control tension on the heater strip 25.

Figure 6:
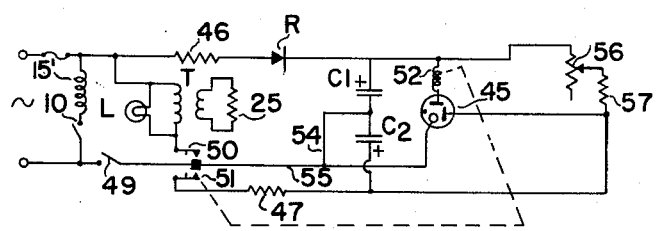
FIG. 6 is a schematic circuit diagram.

FIG. 6 shows the schematic diagram of the control means for moving the pressure bar 4 and applying a pulse of energy to the heater bar 3.

The relay operated contacts 50 are normally closed and the contacts 51 are normally open. These contacts are operated by the relay coil 52 connected to the plate of the gas tube 45 which may be of the Thyraton type.

When the foot switch 10 is closed the coil 15' of valve 15 is energized, thereby operating solenoid valve 15 to operate the piston 7 downwardly, to close the jaws of the heater. When the jaws are closed micro switch 49 is closed, energizing transformer T, lamp L, and the heater 25.

At the same time, condenser C1 is charged through resistor 46, rectifier R, lead 54 and lead 55. At the same time, condenser C2 is charged through resistor 46, rectifier R, potentiometer 56 and resistor 57. When the grid of tube 45 becomes sufficiently positive at approximately —105 volts minimum the tube fires, thereby energizing relay coil 52 which opens contact 50 and closes contact 51. This deenergizes the transformer and valve 15 and permits the spring 7A to return the piston 7 upwardly. Condenser C2 then discharges through resistor 47 and contacts 51.

The opening of contacts 50 deenergizes lamp L and the foot switch may then be released. Condenser C1 acts as a filter to eliminate relay chatter.

Tube 45 is cut off when micro switch 49 is opened by opening of the heater jaws, and the circuit is ready for another cycle. The heater pulse time is controlled by the time constant of the C2 charging circuit.

FIGS. 4 and 5 show an alternate method of mounting the heater strip. The heater bar 60 is similar to the heater bar previously described except that it is modified to receive the mounting block 61 which has a pilot shaft 62 which is adapted to extend into the pilot shaftway 63. The pilot shaft 62 has a spring 64 which is adapted to keep tension on the heater element. The block 61 may be loosely connected to the heater bar 60 by means of a bolt (not shown) through shaftway 65 which extends to the tapped aperture 66 in the heater bar. This means also provides temporary lock when installing the heater. An internally tapped metal insert 67 is mounted in the block 61 which may be of plastic and the heater element 68 is secured to the insert 67 by means of a screw which engages the internal threads in the insert 67. The bar 60 may be of insulating material or of metal. If it is of metal an insulating strip like strip 24, FIG. 2, may insulate the heater from the bar.

Many modifications may be made by those who desire to practice the invention without departing from the scope thereof which is defined by the following claims.

I claim:
1. In heat sealing means,
heater bar means comprising a bar having two pilot shaftways one at each end,
said shaftways having two portions one having greater diameter than the other,
a pair of insulating blocks each having a pilot shaft mounted in one of such shaftways,
a heater strip,
means to removably connect said strip to said blocks, and
spring means connected to said mounting shafts to control tension on said strip.
2. In heat sealing means,
heater bar means comprising an elongated bar having two pilot shaftways one at each end,
said shaftways being parallel to the axis of bar and having two portions one having greater diameter than the other,
a pair of insulating blocks each having a pilot shaft mounted in one of such shaftways,
a heater strip,
means to removably connect said strip to said blocks, and
spring means on said mounting shafts and adapted to fit in said shaftways to control tension on said strips.

References Cited by the Examiner
UNITED STATES PATENTS

| | | | |
|---|---|---|---|
| 2,435,027 | 1/48 | Blomberg | 317—151 X |
| 2,509,439 | 5/50 | Langer | 219—243 X |
| 2,514,197 | 7/50 | Groten et al. | 156—158 |
| 2,630,396 | 3/53 | Langer | 219—243 X |
| 2,633,443 | 3/53 | Langer | 219—243 X |
| 2,646,105 | 7/53 | Langer | 219—243 X |
| 2,682,294 | 6/54 | Langer | 219—542 X |
| 2,726,707 | 12/55 | Wellons et al. | 156—305 |
| 2,751,965 | 6/56 | Miller | 219—243 X |
| 2,796,913 | 6/57 | Fener et al. | 156—251 |
| 2,802,086 | 8/57 | Fener | 156—583 |
| 2,963,838 | 12/60 | Harrison et al. | 156—583 X |
| 3,008,028 | 11/61 | Christensson | 156—583 X |

RICHARD M. WOOD, *Primary Examiner.*